Figure 1:
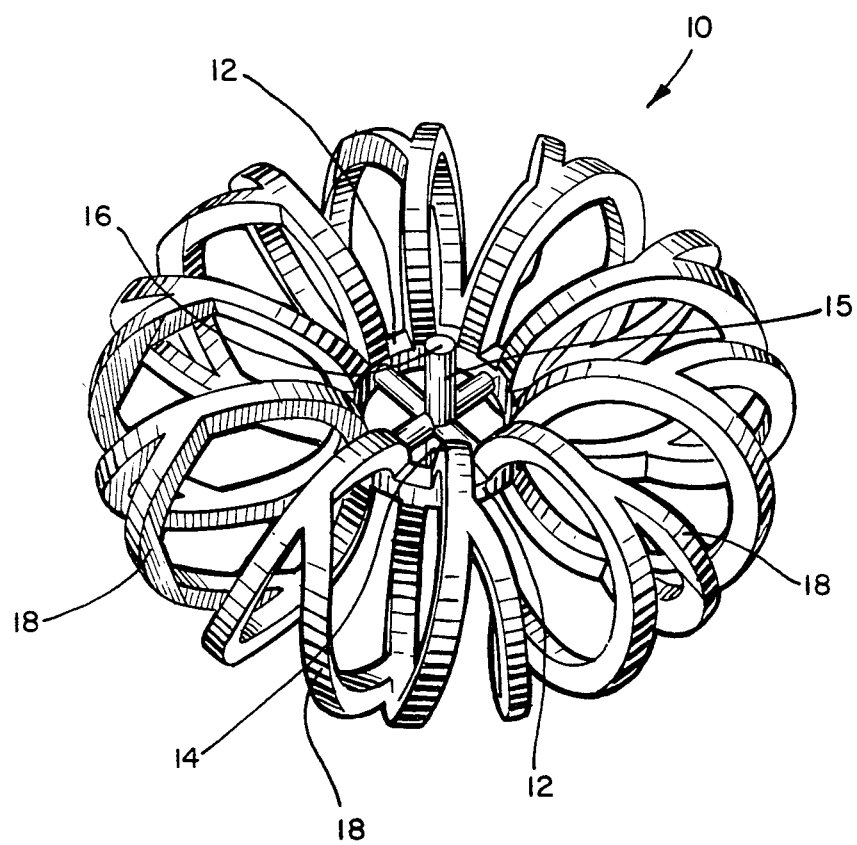

United States Patent [19]

Glen et al.

[11] Patent Number: 4,554,114
[45] Date of Patent: Nov. 19, 1985

[54] PACKING ELEMENT AND METHOD USING SAME

[75] Inventors: John D. Glen; Rose-Mary M. Glen, both of Boston, Mass.

[73] Assignee: Telpac Company Limited, Boston, Mass.

[21] Appl. No.: 303,485

[22] Filed: Sep. 18, 1981

[51] Int. Cl.[4] .............................................. B01D 3/04
[52] U.S. Cl. ............................... 261/95; 261/DIG. 72
[58] Field of Search ........................... 261/DIG. 72, 95

[56] References Cited

U.S. PATENT DOCUMENTS

| | | | |
|---|---|---|---|
| 1,365,671 | 1/1921 | Fairlie | 261/DIG. 72 |
| 2,867,425 | 1/1959 | Teller | 261/DIG. 72 |
| 3,752,453 | 8/1973 | Doyne | 261/DIG. 72 |
| 3,958,958 | 5/1976 | Klugman et al. | 261/DIG. 72 |
| 4,203,935 | 5/1980 | Hackenjos | 261/DIG. 72 |

FOREIGN PATENT DOCUMENTS

| | | | |
|---|---|---|---|
| 2403818 | 9/1977 | France | 261/DIG. 72 |
| 598856 | 5/1978 | Switzerland | 261/DIG. 72 |

OTHER PUBLICATIONS

Spiral-Pac, Pub. of Croll-Reynolds Co., Inc., 751 Central Ave., Westfield, N.J. 07091.
Ceilcote, Bulletin 1200, The Ceilcote Co., 140 Sheldon Rd., Berea, Ohio 44017.

*Primary Examiner*—Tim Miles
*Attorney, Agent, or Firm*—Andrew F. Kehoe

[57] ABSTRACT

Improved plastic-loop packing elements of the type comprising an approximation of a filamentous toroidal helical shape. A process and tower using the elements are also claimed.

The improved packing comprises spline web means connecting adjacent loop members and a centerpost structure.

7 Claims, 1 Drawing Figure

PACKING ELEMENT AND METHOD USING SAME

BACKGROUND OF THE INVENTION

This invention relates to packings intended for use in promoting gas/liquid and liquid/liquid contact processes in absorption towers and the like. These packings are dumped into absorption towers where they assume random orientation and provide surface for augmenting the total amount of liquid surface available to gas flowing through the process zone.

Plastic absorption tower packings of the type having the general configuration of a filamentous toroidal helix are known in the art. Such packings as introduced by A. J. Teller and described in U.S. Pat. No. 2,867,425 have been very successful in commerce. An excessive tendency for the early packings of this type to nest and to interlock was mitigated by further improvements such as those disclosed in U.S. Pat. No. 3,752,453 to R. F. Doyne. Doyne added a circumferential ring to the original Teller design and significantly reduced the tendency to interlocking of the toroidal loop members of the packing elements.

Nevertheless, a significant tendency to nest did remain in the Doyne design. Consequently, it remained desirable to improve still further on the packings of the type under discussion and to do so in a manner that would not unduly interfere with the practical manufacture of such packings by an injection molding of the packing elements from thermoplastic materials.

It is to be understood that the above evaluation of the background is necessarily made with the advantage of knowing the value of the present invention. It is not to be inferred that prior artisans understood the problems associated with the earlier work as it has been described herein.

SUMMARY OF THE INVENTION

Therefore it is a principal object of the invention to provide an improved packing material for use in facilitating the creation of liquid surface area in gas/liquid contacting beds, and to provide improved absorption towers which comprise these packings.

Another object of the invention is to provide a packing material of the toroidal helical shape which is characterized by improved packing characteristics and improved mass transfer efficiency and particularly improved gas absorption efficiencies.

A further object of the invention is to achieve the above-recited objects in a product which can be conveniently injection-molded from thermoplastic molding powders.

Another object of the invention is to provide an improved process of obtaining gas liquid contact in a packed tower.

Other objects of the invention will be obvious to those skilled in the art on their reading of this disclosure.

The above objects have been substantially achieved by the construction of a toroidal-looped packing which comprises splines joining adjacent loops which is, preferably, free of a circumferential structural member. It is also desirable that the packing element of the invention comprise center posts which are axially oriented with respect to the rest of the structure and protrude to a distance such that the end of the posts and the edge of the toroidal loops are approximately coplanar.

The above structure is, partially, a result of the perception that the circumferential ring structure, although avoiding excessive interlocking of the loops, actually reduces the depth of interlock beyond the minimum required for maximum efficiency of the packing. In addition, the ring-bearing structures are perceived to still nest excessively. The new structure wholly avoids these problems by allowing a controlled degree of circumferential interlocking while at the same time eliminating the problem of nesting.

In liquid-gas contact applications, it is believed that the efficiency of column packings of this type relates to the rate at which "liquid surface renewal" area is created. This is achieved when droplets form, fall, strike another packing surface and disintegrate to form more liquid surface for liquid gas contact. Also, however, droplet formation is facilitated at hold-up points, i.e., points where two segments of a single or different packings intersect. At such points droplets grow before falling or rolling away to create still more of each liquid surface for contact with gas.

The present invention substantially increases the liquid gas contact efficiencies because it promotes each of these structural factors without resort to an interlock-impeding structure which markedly interferes with either of the factors.

In addition the present invention avoids, with the advantageous center-post, excessive nesting.

The result is a more efficient, yet highly crush-resistant structure, one that will maintain the even distribution and optimum density of an efficient column yet provide excellent load-bearing characteristics.

The packings of the invention are suitably formed of any material which has a surface conducive to droplet formation and mobility. In practice, light-weight materials are preferred to minimize handling and transportation costs and to avoid structural demands on the towers and columns into which they are to be loaded. Moreover, thermoplastics are practical choices because they allow injection molding of the packing elements. In practice polypropylene is usually used. However, many other organic resins can be utilized when more structual strength, higher operating temperatures, or even chemical nature of a particular system require.

In the description of the packing element of the invention shown below, the discussion assumes a top and bottom to the element. It will be understood that this is a convention selected for convenience and that, in practice, the elements are utilized in a random orientation within a packed column.

Also, in this application, those packings, which are formed of a series of loops starting and terminating at different but adjacent sites around a hub are defined as being of a filamentous toroidal helix configuration. It should be understood that this configuration is preferable to one wherein the terminal of the loops are not offset because there is a substantial increase in the distribution of the hold-up sites described above.

Nevertheless, such a continuous filament modification of the preferred, offset-loop embodiment should be recognized as merely an imperfect practice of the invention defined herein. Indeed a continuous loop structure will be most practical when the hub is not a physical ring, as in the preferred embodiment of the invention, but is only a geometrical situs for the smaller diameter boundary of the array of loops.

Although the packings of the invention may assume many geometrical configurations, the usual commercial practice is to provide packings which allow an initial free volume in excess of 80% within a packing column, often up to about 95% free volume. The amount of surface area provided is usually in the range of about 25 to 45 square foot per cubic foot of packing volume. The packing of the present invention will usually yield improved efficiencies compared to prior art packing structures, at any balance of geometric parameters within this range, assuming such parameters as wettability and the structural strength of the material of construction do not distort a meaningful comparison. It is to be emphasized that these efficiencies are such that they wholly dominate the operating characteristics of the chambers in which they are utilized. Thus, wholly-new absorption towers having novel efficiencies are provided by the present invention.

In practice it is often desirable to have a slightly textured surface on the packings. It is believed this helps in droplet formation. It is a procedure widely utilized in the art.

ILLUSTRATIVE EMBODIMENT OF THE INVENTION

In this application and accompanying drawings there is shown and described a preferred embodiment of the invention and suggested alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWING

The drawing is a perspective view of a single packing element of the invention.

Illustrated is an injection-molded, monolithic, packing element 10. Element 10 comprises a circular hub member 12, a number of primary loop members 14 mounted around hub member 12, the ends of which are slightly set off from one another where they are joined to hub member 12, a central post 15 mounted axially to said hub member 12. The ends 16 of post 15 extend until they are approximately in the same plane as the uppermost and lowermost portion of loop member 14.

Adjacent loop members are connected by inter-loop barrier means, i.e. splines 18 which run from the upper portion of one loop to the lower portion of the adjacent loop or vice versa. These splines 18 form means to reinforce the structure, but also form means to control the amount of circumferential interlocking.

In the illustrated and preferred embodiment of the invention, a post 15 serves also to provide minimal nesting. It is to be emphasized, however, that a major improvement over the prior art is achieved without incorporation of the center post.

Also, it is pointed out that as few as one-half of the splines 18 may be utilized to achieve a major degree of interference with circumferential nesting. When this mode of the invention is practiced, the barrier members are advantageously alternated around the loop structure. Thus every second barrier member shown in the drawing would be eliminated.

In the embodiment disclosed, the overall maximum diameter of the packing element is about 2.75 inches. The primary loops are spaced about 36 degrees from one another around the hub ring and the overall height of the loops is about 1.125 inches. The width of the loop bands and of the interconnecting bands forming the barrier means is about 0.1 inches.

"Nesting" is defined herein as a packing action wherein the elements tend to stack vertically and unduly increase the density of the packing in an absorption chamber.

Interlocking is defined herein as a packing action wherein the loops tend to mesh to some extent, at some angle, displaced from the vertical. A controlled degree of interlock is desirable.

It is a particular advantage of the invention that one can control the number, the deviance from horizontal and the direction of splines for a given absorption operation.

Another advantage of the invention is that it provides a means to incorporate thinner-filament structure loops and splines, thereby providing an improved particulate-capturing ability, while maintaining a greater degree of structural strength to avoid excessive compression.

It is also to be undersood that the following claims are intended to cover all of the generic and specific features of the invention herein described and all statements of the scope of the invention which might be said to fall therebetween.

What is claimed is:

1. In a packaging element of the filamentous toroidal helix type utilized in gas/liquid contact process comprising a series of loop members mounted about the circumference of a hub in an array that is generally perpendicular to said hub and wherein said loop members are connected to at least one adjacent loop member by at least one interloop barrier means which extends from a position near the top of one said loop member to a position near the bottom of said adjacent loop member, the improvement wherein said packing element comprises, axially positioned within said hub, a post-like member which extends upwardly and downwardly to terminate in planes near the upper and lower dimensions of said loops, said post-like members forming means to substantially reduce vertical nesting of a plurality of said packing elements.

2. A packing element is defined in claim 1 wherein each loop means is connected to each adjacent loop means by a said inter-loop barrier means.

3. A packing element defined in claim 1 having a structure free of any substantial structure lying exterior from the outermost perimeter of said array of loops.

4. A packing element as defined in claims 2 or 3 wherein, within an axially-positioned hub member, is a post member extending upwardly and downwardly from said hub to terminate in planes approximately coplanar with the upper and lower limits, respectively, of said loops.

5. A process for facilitating the contact of gas and liquid by utilizing packing of the type comprising randomly-oriented packing elements of the filamentous toroidal helix-type comprising the steps of contacting said gas with packings of the type defined in claims 1, 2, or 3.

6. A gas absorption chamber comprising, as a means to provide a surface for facilitating the continuous creation of newly-formed liquid surface throughout the chamber, the improvement wherein said means to provide liquid-wettable surface is a randomly-oriented mass of packing elements of the type defined in claims 1, 2, or 3.

7. In a packing element of the filamentous toroidal helix type utilized in gas/liquid contact process comprising a series of loop members mounted about the circumference of a hub in an array that is generally perpendicular to said hub, free of any substantial structure lying exterior from the outermost perimeter of the said array of loops, the improvement wherein said packing element comprises, axially positioned within said hub, a post-like member which extends upwardly and downwardly to terminate in planes near the upper and lower dimension of said loops, said post-like member forming means to substantially reduce vertical nesting of a plurality of said packing elements.

* * * * *

UNITED STATES PATENT AND TRADEMARK OFFICE
CERTIFICATE OF CORRECTION

PATENT NO. : 4,554,114

DATED : November 19, 1985

INVENTOR(S) : John D. Glen et al

It is certified that error appears in the above-identified patent and that said Letters Patent is hereby corrected as shown below:

Column 4, line 31, "packaging" should read --packing--.

Signed and Sealed this

Tenth Day of May, 1988

Attest:

DONALD J. QUIGG

Attesting Officer

Commissioner of Patents and Trademarks